United States Patent [19]
Labuhn et al.

[11] Patent Number: 5,454,442
[45] Date of Patent: Oct. 3, 1995

[54] ADAPTIVE CRUISE CONTROL

[75] Inventors: Pamela I. Labuhn, Mt. Clemens; William J. Chundrlik, Jr., Rochester Hills, both of Mich.

[73] Assignee: General Motors Corporation, Detroit, Mich.

[21] Appl. No.: 143,961

[22] Filed: Nov. 1, 1993

[51] Int. Cl.[6] .................................................. B60K 31/00
[52] U.S. Cl. .................... 180/169; 180/170; 364/426.04; 340/904
[58] Field of Search ..................... 180/169, 170, 180/171; 364/426.04; 342/455; 318/587; 340/436, 905, 903, 904

[56] References Cited

U.S. PATENT DOCUMENTS

| 5,014,200 | 5/1991 | Chundrlik et al. | 364/426.04 |
|---|---|---|---|
| 5,053,979 | 10/1991 | Etoh | 180/170 |
| 5,165,497 | 11/1992 | Chi | 180/169 |
| 5,166,881 | 11/1992 | Akasu | 180/169 |
| 5,177,462 | 1/1993 | Kajiwara | 180/169 |
| 5,230,400 | 7/1993 | Kakinami et al. | 180/169 |
| 5,234,071 | 10/1993 | Kajiwara | 180/169 |
| 5,375,060 | 12/1994 | Nöcker | 180/169 |
| 5,396,426 | 3/1995 | Hibino et al. | 180/169 |
| 5,400,864 | 3/1995 | Winner et al. | 180/169 |

FOREIGN PATENT DOCUMENTS

| 53543 | 3/1983 | Japan | 180/169 |
|---|---|---|---|
| 3132434 | 6/1991 | Japan | 180/169 |
| 4201642 | 7/1992 | Japan | 180/169 |
| 4260836 | 9/1992 | Japan | 180/169 |

*Primary Examiner*—Karin L. Tyson
*Assistant Examiner*—Carla Mattix
*Attorney, Agent, or Firm*—Michael J. Bridges

[57] ABSTRACT

Adaptive cruise control speed limiting consistent with sensor and system limitations ensures an adaptive cruise control source vehicle operates in adaptively controllable speed ranges including speed ranges corresponding to following distances within the sensor range and excluding speed ranges at which preceding targets are not reliably distinguishable by the sensing system.

9 Claims, 3 Drawing Sheets

ADAPTIVE CRUISE CONTROL

INCORPORATION BY REFERENCE

U.S. Pat. No. 5,014,200 is hereby incorporated herein by reference.

1. Field of the Invention

This invention relates to vehicle speed control and, more specifically, to speed limiting in adaptive cruise control for automotive vehicles.

2. Background of the Invention

Adaptive cruise control systems have been proposed having conventional cruise control which may be overridden in certain circumstances by an adaptive vehicle speed control. The conventional cruise control, when active, may include a control function designed to minimize a difference between actual vehicle speed and a driver set speed. The adaptive speed control adapts any active conventional control to the environment external to the source vehicle (the controlled vehicle) by attempting to account for targets preceding such vehicle within a distance of the vehicle and in the path of the vehicle.

The adaptation lies in the reduction of the commanded vehicle speed below the driver set speed by an amount determined and periodically updated to provide controlled following of sensed preceding targets. A speed command is generated, based, in part, on the speed relationship between the source vehicle and the preceding target, and the driver set is limited accordingly, to adapt the source vehicle speed to that of the target and provide the controlled following.

Adaptive cruise control systems, such as the system described in U.S. Pat. No. 5,014,200, incorporated herein by reference and assigned to the assignee of this invention, incorporate information on driver reaction time and driving style in a determination of a desired following distance between the source and target vehicles at the target vehicle speed. For a fixed driver reaction time and preferred driving style, the desired following distance should increase then with increasing vehicle speed, to provide time for driver reaction to target vehicle maneuvers.

Adaptive cruise control includes an obstacle detector or sensor, such as a radar or laser transmitter and receiver, mounted in a forward position on the source vehicle, which propagates a beam in the forward path of the vehicle and receives reflections indicative of obstacles in the beam path. Such detectors have a maximum sensing range, outside of which the sensor may not be capable of providing reliable information on the presence of obstacles.

Furthermore, the obstacle sensor may be significantly sensitive to noise under certain operating conditions. The reliability of the adaptive cruise control requires close attention to such sensor range limitations and requires that target vehicles moving at severely noise sensitive velocities not be followed.

The sensor range limitations may be substantially fixed for a given sensor. For example, with radar-based sensors, a broad radar beamwidth may be desirable, such as to minimize the radar antenna size. However, a wide beamwidth will decrease effective radar range, as the wide beam will tend to pick up obstacles outside the traffic lane of interest at a shorter range than will a relatively narrow beam. Further, it may be desirable to operate a sensor at low power, which may decrease its range. Additionally, such range limitations may depend on the vehicle operating environment. A radar-based sensor may lose range in heavy rainfall, or a laser-based sensor may decrease in range when operating in heavy fog.

When following a target vehicle, the source vehicle will adjust its speed to that of the target vehicle, while adjusting the spacing of the vehicles toward a desired following distance determined as a function of the target vehicle speed. If that desired following distance exceeds the range of the obstacle detector or sensor, control oscillations may result. Such oscillations occur as the source vehicle moves out of the sensor range, so as to not be able to reliably detect the target vehicle, at which time vehicle speed control at the driver set speed will resume, not limited by the adaptive cruise control. The source vehicle may then approach the target vehicle under the driver set speed, until such time as, once again, it is within the sensor range. The controlled following of the target vehicle will again be attempted, forcing the source vehicle to the desired following distance which may again exceed the sensor range. Such control oscillations may be perceived by the vehicle driver or occupants as cyclic deceleration and acceleration of the vehicle, as the vehicle moves into and out of the sensor range.

Obstacle sensor noise sensitivity may decrease target vehicle sensing reliability. Such sensitivity may only be significant at certain sensor operating frequencies or under certain operating conditions. For example, heavy rainfall may significantly degrade the capacity of conventional frequency modulated continuous wave radar systems, as may be applied in adaptive cruise control, to distinguish targets moving at speeds within certain speed ranges. Such is the result of noise injected by rain-based signal interference into sensor frequency bands corresponding to those speed ranges. The ability of the adaptive cruise control to follow a target vehicle in a stable, reliable manner may deteriorate if the target is not highly distinguishable.

Control oscillations, and unreliable or unstable target vehicle following may not be pleasing to the driver or occupants of the source vehicle, and may affect the commercial success of the adaptive cruise control system.

Accordingly, it would be desirable to control the speed of a vehicle having an adaptive cruise control system in a manner reflecting obstacle sensor range limitations and target speed detection shortcomings.

SUMMARY OF THE INVENTION

The present invention provides the desirable speed control applied to an adaptive cruise control system in accord with information provided on maximum effective obstacle detector range and on reliably detectable target vehicle speeds.

Specifically, the present invention, applied to an adaptive cruise control system, makes use of information available on the maximum effective range of the obstacle sensor included in the adaptive cruise control system, such as may account for inherent detection system limitations and for environmental limitations, to determine a maximum desired spacing between the source vehicle and a sensed target vehicle. The maximum desired spacing is determined to provide smooth control of the speed of the source vehicle, such as by providing for a maximum desired spacing a distance within the maximum effective sensor range. The desired following distance is then applied in a determination of a corresponding speed limit. The speed of the source vehicle will then be limited by the speed limit so as to not require a desired following distance exceeding the maximum desired spacing.

Driving style preference and driver reaction time may be accounted for in the determination of the speed limit.

In a further aspect of the invention, information provided on target speeds not reliably detected by the sensor may be used in a determination of a maximum desired speed of the source vehicle. This maximum desired speed will be an amount less than the lowest target speed that may not be reliably detected. The commanded source speed may be limited by the maximum desired speed, to avoid following target vehicles that may not be reliably or consistently followed.

BRIEF DESCRIPTION OF THE DRAWINGS

The invention may be best understood by reference to the following description of a preferred embodiment and to the drawings in which.

DESCRIPTION OF THE PREFERRED EMBODIMENT

U.S. Pat. No. 5,014,200 is incorporated herein by reference. In that patent, a source vehicle having an adaptive cruise control system is described. The system includes a conventional sensor, such as a radar sensor, which communicates information concerning the distance to and relative velocity of a target vehicle to a radar computer. The radar computer extracts relative velocity $V_R$ and distance $D_A$ estimates from the radar sensor output, and provides $V_R$ and $D_A$ signals to an adaptive cruise computer.

Figure 1:
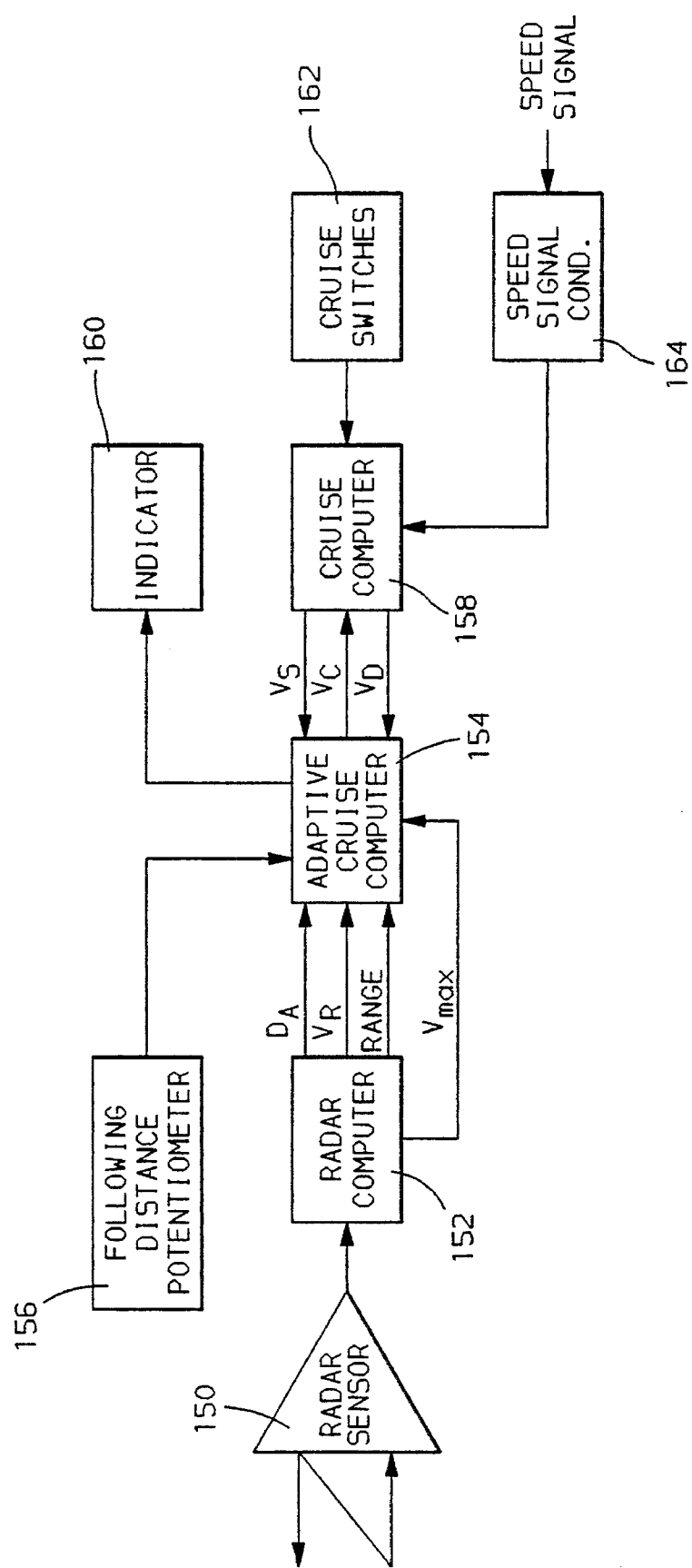
FIG. 1 generally illustrates the control hardware of the preferred embodiment as included on a source vehicle having the adaptive cruise control of the preferred embodiment.

In the preferred embodiment of the present invention, the radar computer operates to supply additional information to the adaptive cruise computer. For example, as illustrated in FIG. 1, radar computer 152 generates information on RANGE, the maximum useful range of radar sensor 150 and $V_{max}$, the maximum target speed that can be reliably detected by radar sensor 150, and provides such information to adaptive cruise computer 154. Alternatively, RANGE may be generated in the adaptive cruise computer 154, and operating conditions, such as relevant weather conditions may be generated in the radar computer 152 and provided to the adaptive cruise computer for use in accord with the present embodiment.

RANGE may be generated through a conventional calibration of the sensor 150. For example, assuming a traffic lane width of 3.6 meters and a ten degree radar beam, the beam would propagate outside the traffic lane of the source vehicle approximately 20.6 meters ahead of the radar sensor 150 on a substantially straight road. Accordingly, targets irrelevant for the purposes of the adaptive cruise control of the present embodiment may be detected outside 20.6 meters. Accordingly, if the sensor has sufficient power to detect target vehicles at least 20.6 meters ahead of the source vehicle, the maximum useful range generated by the radar computer for following of target vehicles would be 20.6 meters.

Information on weather conditions, as may be sensed through use of conventional sensors (not shown), may be used to adjust the magnitude of RANGE. For example, in the embodiment using a radar sensor 150, it is generally known that heavy rainfall, such as rainfall at a rate greater than ten millimeters per hour, may reduce the magnitude of the power of any received radar information by the radar sensor 150, limiting the useful maximum range of the sensor.

Additionally, it is likewise known that weather conditions significantly affecting visibility, such as fog, may reduce the maximum useful range of a laser based sensor. The inventors intend that weather conditions, such as precipitation or fog, that are known by those skilled in the art to bear on the maximum range at which reliable sensor information may be provided, should be used in the determination of RANGE, and that RANGE should be updated with benefit of such information periodically so as to adapt to changes in such weather conditions.

Furthermore, in the preferred embodiment in which a conventional frequency-modulated, continuous-wave FMCW radar may be used as obstacle detector 150, there may be "blind spots" in target speed $V_T$ at which a target cannot be detected by the FMCW radar. For example, rainfall may inject noise into received FMCW radar reflections at frequencies corresponding to certain $V_T$, eroding the capacity to distinguish a target moving at such speeds.

Accordingly, any information available to radar computer 152 on weather conditions affecting the presence of blind spots at certain target speeds, such as information from a conventional precipitation rate sensor (not shown) may be used by radar computer 152 in a determination of the presence of any target speeds or target speed ranges at which unreliable target sensing may exist. $V_{max}$ should then be set to the lowest of any $V_T$ determined to not be reliably detectable, such as due to prevailing weather conditions. $V_{max}$ is used as a basis for a limit on the set travelling speed of the source vehicle, so as to avoid following of a target vehicle above $V_{max}$, as will be described.

As described in the reference incorporated herein, the adaptive cruise computer 154 receives information from a following distance potentiometer 156, and signals from cruise computer 158 including a signal $V_S$ indicative of actual speed of the source vehicle, and a signal $V_D$ indicative of the driver set speed. Cruise computer 158 receives a conditioned actual vehicle speed signal through speed signal conditioning circuitry 164. Cruise computer 158 additionally receives cruise control commands through a conventional set of driver-actuated cruise switches 162. Through benefit of the information provided thereto, the adaptive cruise computer 154 computes a commanded velocity signal VC, which is output to cruise computer 158 as the commanded speed toward which the speed control of the cruise computer should control actual vehicle speed. An indicator 160, such as a conventional lamp or audible alert is positioned so as to be noticeable by the source vehicle operator, such as through placement on the instrument panel (not shown) of the source vehicle. The indicator is selectively energized by the adaptive cruise computer 154, as will be described.

Figure 2:
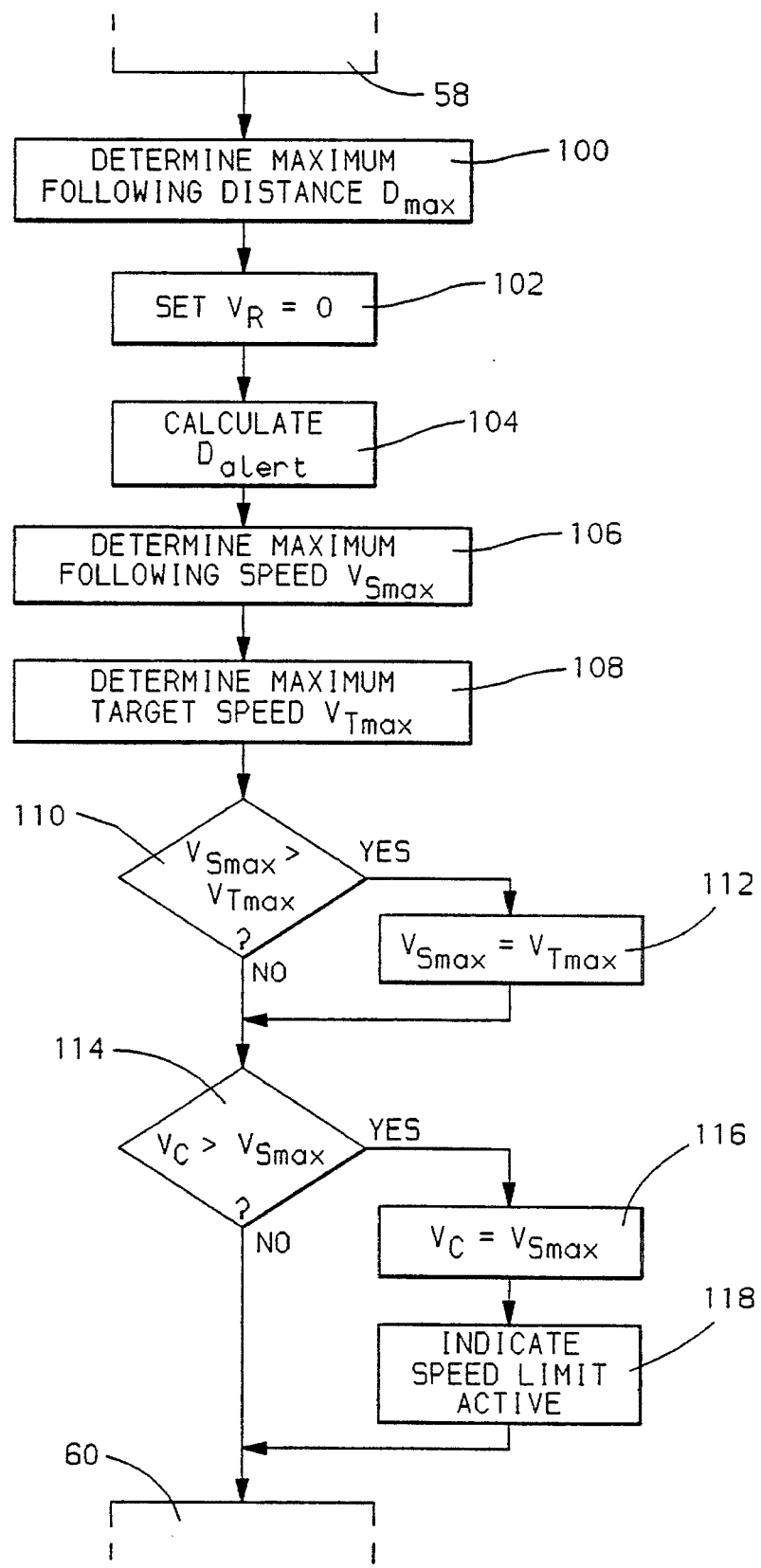
FIG. 2 is a computer flow diagram illustrating the steps to be added to the preferred embodiment of the invention incorporated herein to describe the preferred embodiment of the present invention.

The process used to compute $V_C$ in the incorporated reference is generally as follows. An alert distance $D_{alert}$ is first computed generally as a function of $T_r$ and $V_S$, for example as follows $$D_{alert}=(V_S^2/K_1)-(\{V_S-V_R\}^2/K_2)+T_r V_S$$

in which $K_1$ and $K_2$ are vehicle deceleration rate constants, and $T_r$ is a driver reaction time established by the vehicle operator by operation of the following distance potentiometer 156 (FIG. 2 of the incorporated reference). Next, a desired following distance $D_D$ is determined as the sum of $D_{alert}$ and X, in which X is a constant such as 13 meters. A determination of $V_C$ follows next as the source vehicle speed required to maintain the desired following distance $D_D$ between the source and target vehicles, such as by the following $$V_C = K(D_D - D_A) + (V_S - V_R)$$

in which $K_P$ is a gain constant. In the incorporated reference, the lesser of this calculated $V_C$ and the driver set speed $V_D$ is provided the cruise computer as the desired source vehicle speed.

In accord with the present invention, additional steps are incorporated in the determination of the desired source vehicle speed. Such steps are illustrated in FIG. 2 as steps 100–116, and are, in accord with the present embodiment, to be inserted between step 58 and 60 of the routine of FIG. 4 in the incorporated reference.

Specifically, after determining $V_C$ and limiting $V_C$ to $V_D$ at step 58 of the incorporated reference, the routine of the present embodiment moves to a step 100 of FIG. 2, at which a maximum following distance $D_{MAX}$ is determined. In order to avoid following distance excursions beyond RANGE due to adaptive cruise control overshoot, $D_{MAX}$ is set a predetermined distance within RANGE and is used as the maximum allowable distance with which to follow the target vehicle.

A value $D_B$ is thus determined, such as through a conventional calibration process for the adaptive cruise control system as a distance slightly greater than the maximum expected control overshoot. For example, if following distance overshoot of five meters is expected, $D_B$ may be set to a value such as ten meters. $D_B$ may be a fixed value, stored in adaptive cruise computer 154 (FIG. 1) memory, or may vary with such operating conditions as affect the degree of overshoot of the adaptive cruise control. For example, overshoot may vary with such conditions as source vehicle speed $V_s$ or with speed difference $V_R$. In such cases, $D_B$ should be referenced from adaptive cruise computer memory as a function of a present value of the applicable operating condition, such as through a conventional table lookup function.

After referencing the appropriate $D_B$, $D_{MAX}$ is determined at step 100 as follows $$D_{MAX} = RANGE - D_B.$$

The routine then moves to a step 102, to set the relative velocity term $V_R$ to zero, so that a maximum following speed may be determined through equations adapted to be used for both approach and following of a target vehicle, as will be described. Next, the routine proceeds to a step 104 at which a $D_{ALERT}$ is calculated corresponding to the determined $D_{MAX}$ as follows $$D_{ALERT} = D_{MAX} - X$$

in which X may be constant, such as 13 meters, or may vary as a function of $V_s$, such as $X = k*V_s$.

After determining $D_{ALERT}$ at step 104, the routine moves to a step 106 to determine the maximum following speed $V_{Smax}$ corresponding to the computed $D_{ALERT}$ and thus to the determined $D_{MAX}$, using the following equation from the incorporated reference $$D_{ALERT} = (V_{Smax}^2/K_1) - \{(V_{Smax} - V_R)^2/K_2\} + T_r V_{Smax}$$

in which K1 and K2 are vehicle deceleration rate constants, as described.

Figure 3:
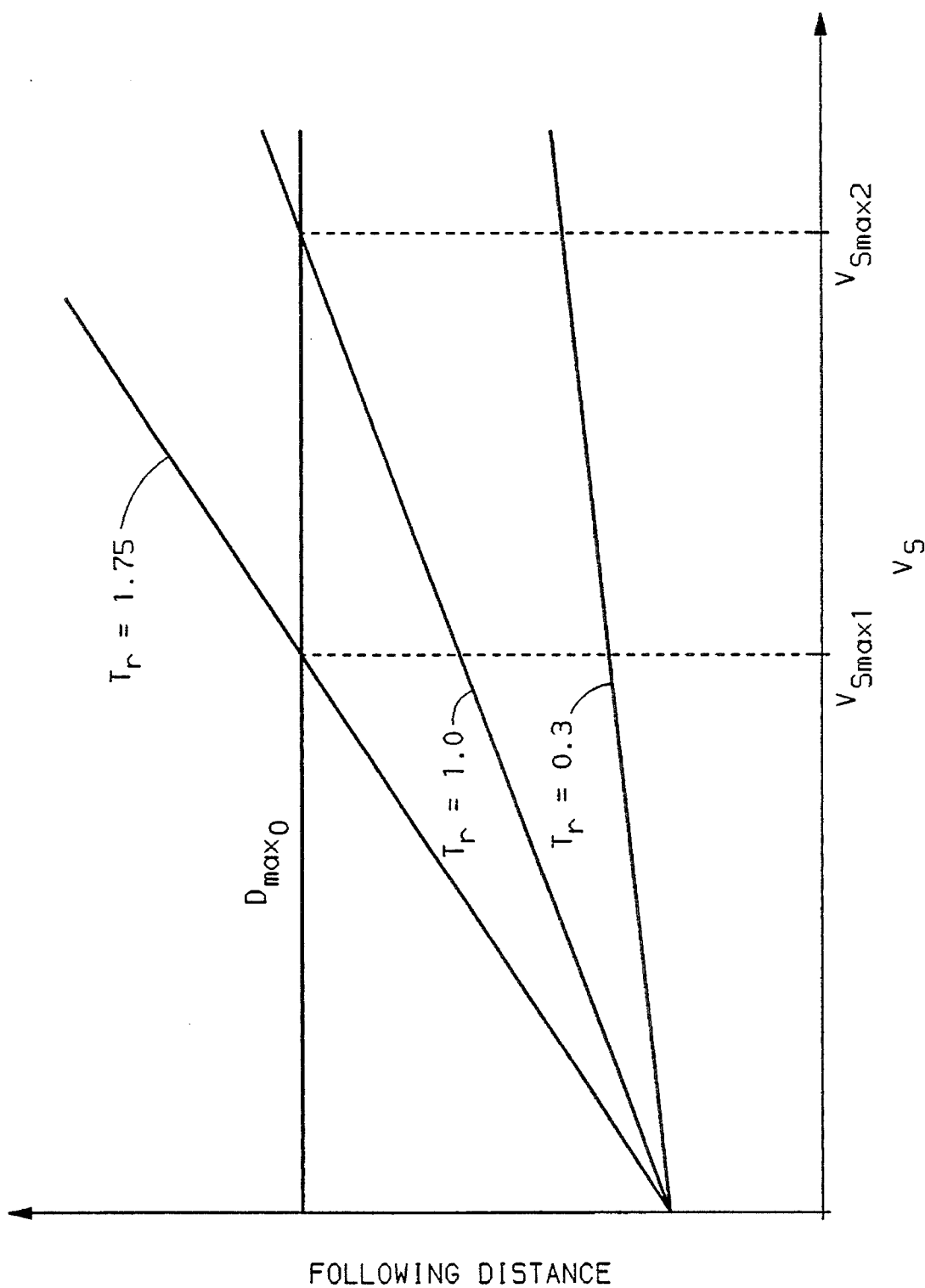
FIG. 3 is a figure portraying a relationship between adaptive cruise control parameters in accord with the present embodiment of this invention.

The conditions under which $V_{Smax}$ are determined include a common speed between the source and target vehicles (i.e. $V_R = 0$) and the spacing between the two vehicles set to the maximum tolerable distance $D_{max}$. As such, $V_{Smax}$ represents the maximum speed at which the source vehicle may follow a target vehicle, for a selected $T_r$. FIG. 3 illustrates a relationship between source vehicle speed $V_S$ and desired spacing between the source and target vehicles for three representative values of $T_r$. As can be seen for $T_r$ settings of 1.75 and 1.0, source vehicle speeds are diagrammed at which the corresponding following distance exceeds $D_{maxo}$, an example of a maximum desired following distance $D_{max}$. By limiting $V_S$ to $V_{Smax1}$ in the case in which $T_r$ is set to 1.75 and to $V_{Smax2}$ in the case in which $T_r$ is set to 1.0, excursions outside the sensor 150 (FIG. 1) range may be avoided.

Beyond the example of the present embodiment, the inventors intend the principles of the present invention to apply to adaptive cruise control systems having sensors with limited range and having the following relationship $$D_D = f(V_S)$$

in which $D_D$ is a desired distance at which to follow a target, and $V_s$ is source vehicle speed, which may preferably be adjusted to that of the target $V_T$. Such systems to which the present invention applies need not include a driver selectable reaction time $T_r$. A alternatively, a measured reaction time may be used in accord with the present invention, such as in the system of U.S. Pat. No. 5,173,859, assigned to the assignee of the present invention, or no driver reaction information may be included at all.

Once a dependance of desired spacing or following distance on desired following speed is recognized in a system including a sensor of limited range, the principles of the present invention apply to restrict the cruise speed $V_s$ at all times which adaptive cruise control is active so as to avoid any following of target vehicles likely to lead to control oscillations or instabilities.

Returning to step 106 of FIG. 2, in the embodiment in which $K_1 = K_2$ and X is a fixed value, the equation for $V_{Smax}$ may be reduced to $$V_{Smax} = (D_{MAX} - X)T_r.$$

Alternatively, in the embodiment in which $K_1$ is not equal to $K_2$ and X is a fixed value, the equation for $V_{Smax}$ may be reduced to the following quadratic equation $$V_{Smax}^2/K_1 - V_{Smax}^2/K_2 + T_r V_{Smax} + X - D_{MAX} = 0.$$

Finally, in the embodiment in which $K_1 = K_2$ and X varies as a function of $V_s$, such as according to $X = K*V_S$, as described, the equation for $V_{Smax}$ may be reduced to $$VSmax = Dmax/(Tr + K).$$

After solving for $V_{Smax}$ at step 106, the routine moves to a step 108, to determine a maximum target speed $V_{Tmax}$ as follows $$V_{Tmax} = V_{max} - V_b$$

in which $V_b$ is a small hysteresis speed offset, applied to $V_{max}$ to ensure any adaptive speed control overshoot will not cause the source vehicle speed to exceed the maximum detectable target speed $V_{max}$. As described, there may be some slight control overshoot associated with the adaptive cruise control of the present embodiment, which may cause excursions into areas the radar sensor 150 (FIG. 1) may not be able to detect, such as target speeds above $V_{max}$. By applying the small hysteresis speed offset $V_b$, set slightly greater than the expected maximum overshoot, such excursions may be avoided. In this embodiment, $V_b$ may be fixed, such as at approximately 3 m.p.h., or may vary with those operating conditions affecting the degree of speed control overshoot in the control, such as with $V_S$ or $V_R$.

After determining $V_{Tmax}$ at step 108, the routine moves to step 110, to compare the calculated $V_{Smax}$ to $V_{Tmax}$. If $V_{Tmax}$ exceeds $V_{Smax}$ at step 110, the routine moves to step 112, to limit $V_{Smax}$ to $V_{Tmax}$. Next, or if limiting was not required at step 110, the routine moves to step 114, to compare the commanded speed $V_C$ to $V_{smax}$. If $V_C$ exceeds $V_{Smax}$, the routine moves to step 116, to limit $V_C$ to $V_{Smax}$, so as to maintain a driver set speed consistent with a following distance within which target vehicles may be detected, and to avoid following target vehicles traveling at speeds not reliably detectable by the radar sensor 150 (FIG. 1), as described.

After limiting $V_C$ at step 116, the routine moves to a step 118 to indicate to the vehicle operator, such as through energization of the indicator 160 (FIG. 1), that the operator set speed has been limited through the constraints imposed by the present routine. Finally, or if such limiting was determined not to be necessary at step 114, the routine moves to step 60 of the routine of the incorporated reference (FIG. 4 thereof), to continue operations of that routine, such as sending the limited $V_C$ to the cruise computer.

The foregoing description of a preferred embodiment for the purpose of describing the invention is not to be considered as limiting or restricting the invention, since many modification may be made by the exercise of skill in the art without departing from the scope of the invention.

The embodiments of the invention in which an exclusive property or privilege is claimed are described as follows:

1. An automatic speed control method in which a commanded following speed of a source vehicle is set in accord with a predetermined function relating desired following speeds to desired following distances between the source vehicle and preceding targets sensed by a target sensor having a maximum range, comprising the steps of:

sensing a preceding target;

sensing an actual following distance between the source vehicle and the sensed preceding target;

generating a desired following speed with which to follow the sensed preceding target;

determining a desired following distance by applying the desired following speed to the predetermined function;

determining a desired source vehicle speed to move the actual following distance toward the determined desired following distance;

generating a maximum following distance as a predetermined function of the target sensor maximum range;

determining a maximum source vehicle speed by applying the maximum following distance to the predetermined function; and limiting the desired source vehicle speed in accord with the determined maximum source vehicle speed.

2. The method of claim 1, further comprising the steps of:

providing a value representing a preferred driving style; and adjusting the predetermined function in accord with the provided value.

3. The method of claim 2, further comprising the step of:

sensing an operator-controlled signal representing an operator selected reaction time, and wherein the step of providing a value provides a value set as a predetermined function of the sensed operator-controlled signal.

4. The method of claim 1, further comprising the steps of:

providing a set of target speeds not reliably detectable by the target sensor;

determining a target speed limit as a predetermined function of the set of target speeds; and limiting the desired source vehicle speed in accord with the determined target speed limit.

5. The method of claim 4, wherein the determining step further comprises the steps of:

ascertaining a minimum speed as the smallest magnitude target speed in the set of target speeds; and setting the target speed limit to the minimum speed less a predetermined offset speed.

6. The method of claim 1, wherein the generating step generates a maximum following distance as the target sensor maximum range less a predetermined offset distance.

7. An automotive vehicle speed control method in which the speed of a source vehicle is modulated in response to a detected preceding target in direction to maintain a desirable following distance between the source vehicle and the target, comprising the steps of:

setting a driving style signal to a level indicative of a preferred driving style;

sensing source vehicle speed;

generating a relative speed value indicative of a relative speed between the source vehicle and the target; sensing an actual following distance between the source vehicle and the detected preceding target;

determining a desired following distance as a predetermined function of the source vehicle speed, the relative speed value, and the level of the driving style signal;

determining a desired source vehicle speed value to adjust the actual following distance toward the desired following distance;

providing a sensor range value indicative of a maximum range of an obstacle sensor;

generating a following distance limit a fixed offset within the sensor range value;

determining a source vehicle speed limit as corresponding to the following distance limit, a relative speed of zero, and the driving style signal in accord with the predetermined function; and limiting the desired speed value to the source vehicle speed limit.

8. The method of claim 7, further comprising the step of:

providing a signal controlled by the operator indicative of an operator reaction time, and wherein the setting step sets the driving style signal in accord with the provided signal.

9. The method of claim 7, further comprising the steps of:

providing a set of target speed ranges not reliably detectable by the obstacle sensor;

determining a target speed limit as a fixed speed less than the lowest speed included in the set of target speed ranges; and limiting the desired speed value to the target speed limit.

\* \* \* \* \*